United States Patent [19]

Raymond et al.

[11] 4,330,371

[45] May 18, 1982

[54] SUPPORT STRUCTURE CORE ASSEMBLY IN A NUCLEAR REACTOR

[75] Inventors: Robert F. Raymond; Clive F. G. Dupen, both of Simsbury, Conn.

[73] Assignee: Electric Power Research Institute, Inc., Palo Alto, Calif.

[21] Appl. No.: 139,879

[22] Filed: Apr. 14, 1980

[51] Int. Cl.³ ............................................. G21C 17/10
[52] U.S. Cl. ..................................... 376/258; 376/362
[58] Field of Search ................................ 176/87, 23, 84

[56] References Cited

U.S. PATENT DOCUMENTS 3,554,868  1/1971  Thorp .................................. 176/87
3,996,102  12/1976  Thome .................................. 176/87

*Primary Examiner*—Donald P. Walsh
*Attorney, Agent, or Firm*—Flehr, Hohbach, Test

[57] ABSTRACT

A nuclear reactor of the type including a reactor vessel and a core assembly to be maintained in a fixed position within the vessel is disclosed herein along with a structural arrangement also located in the vessel, for supporting the core assembly in its fixed position. The structural arrangement disclosed utilizes a plurality of components including a grillage of I-beams interconnected to one another by welded joints so as to define a unitary structure capable of supporting the core assembly within the vessel. These components including the I-beams are also mechanically interlocked such that a total failure of the welded joints will result in a limited but readily detectable downward deflection of the unitary structure, thereby indicating such a failure while, at the same time, retaining sufficient structural integrity to maintain the core assembly in a supported position.

10 Claims, 6 Drawing Figures

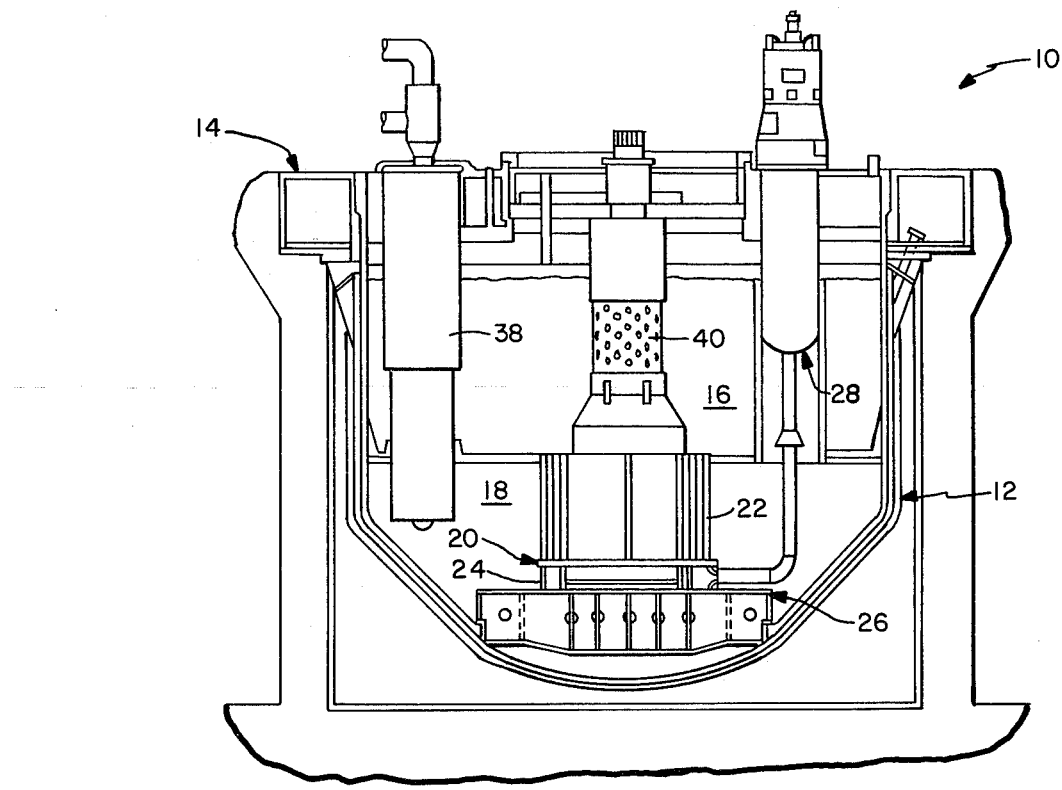
FIG.—1
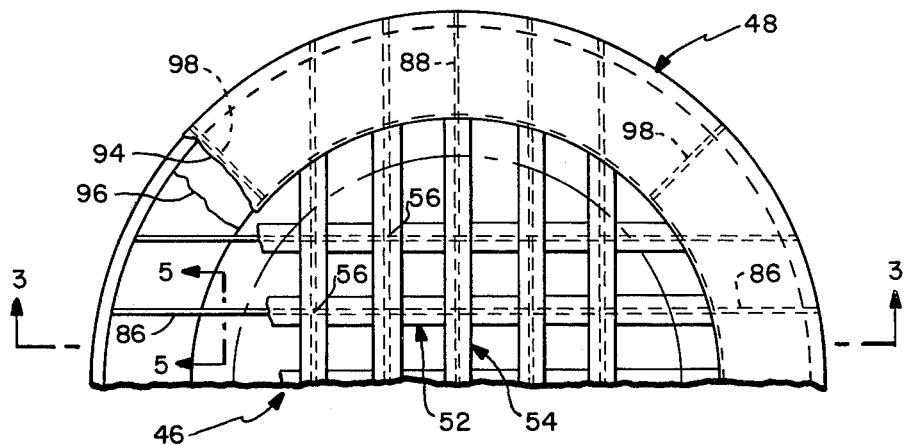
FIG.—2

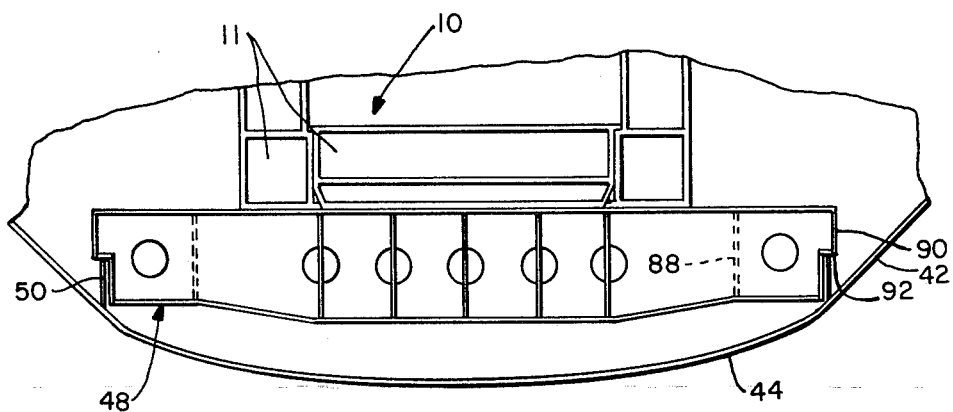
FIG.—3
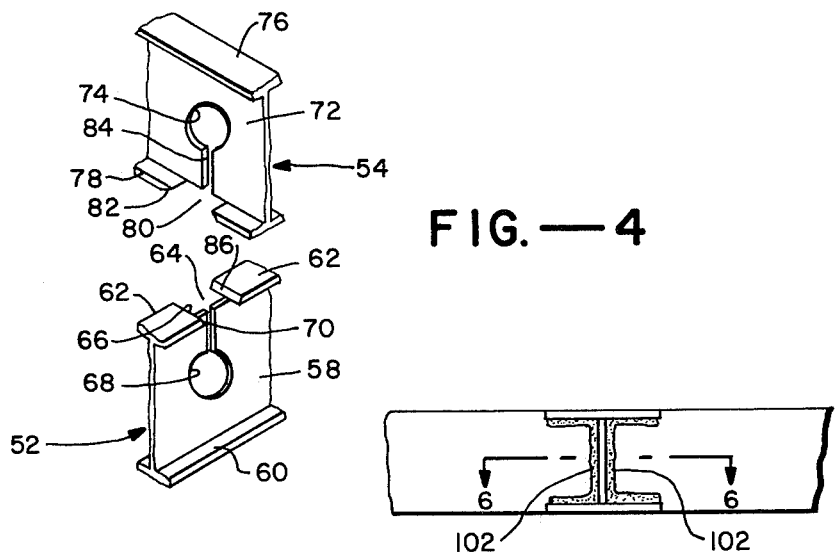
FIG.—4
FIG.—5
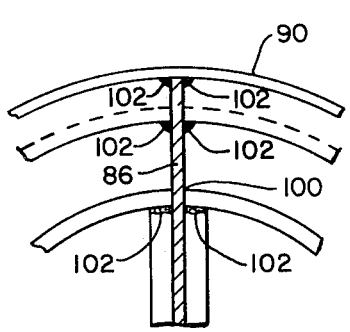
FIG.—6

SUPPORT STRUCTURE CORE ASSEMBLY IN A NUCLEAR REACTOR

The present invention relates generally to nuclear reactors such as pool type liquid metal fast breeder reactor and more particularly to a specifically designed structural arrangement for supporting the core assembly of such a reactor.

The nuclear reactor to be described in more detail hereinafter is one which includes a reactor vessel containing, among other internal components, a core assembly and a structural arrangement located below the core assembly for supporting the latter in a fixed position. In the past, a typical structural arrangement serving this purpose received most if not all of its structural integrity from welded joints interconnecting its various structural components. One major drawback in an arrangement of this general type is the inability in many cases to detect failures in individual welded joints until the joint failures progress to a point of collapse, that is, to a point where the overall structural arrangement is incapable of supporting the core assembly. This is to be contrasted with the present invention which, as will be seen hereinafter, utilizes a support structure including components which are not only connected by welded joints but are also mechanically interlocked to prevent the core assembly from totally collapsing into its support structure, even if all of the welded joints in the latter should fail.

In view of the foregoing, one object of the present invention is to provide an uncomplicated and yet reliable arrangement for supporting a core assembly in a nuclear reactor, specifically in a pool type liquid metal fast breeder reactor.

A more specific object of the present invention is to provide a structural support arrangement which, in part, receives its structural integrity from a number of individual components which are interconnected by means of welded joints but which does not rely in its entirety on these joints for structural integrity so that, even if the welded joints should completely fail, the overall support structure will nevertheless be capable of maintaining the core assembly in a supported position.

Another specific object of the present invention is to provide a structural support arrangement which will support its core assembly in a limited but readily detectable downwardly deflected position in the event of a total failure in the structure's welded joints, thereby indicating such a failure before reaching the point where the entire core assembly collapses.

As stated above, the nuclear reactor disclosed herein includes a reactor vessel, a core assembly to be maintained in a fixed position within the vessel and a structural arrangement, also located within the vessel, for supporting the core assembly in its fixed position. In accordance with the present invention, the structural support arrangement is comprised of a plurality of components interconnected to one another by welded joints and are also mechanically interlocked so as to define a unitary structure which supports the core assembly in its fixed position and which has sufficient structural integrity to support the assembly in a limited downwardly deflected position, even if all of the welded joints should fail. In a preferred embodiment, this downwardly deflected position is one which is readily detectable during normal operation of the reactor without special detection equipment.

In an actual working embodiment, as will be seen hereinafter, the support arrangement disclosed includes a grillage of welded I-beams which are also mechanically interlocked to one another, a circumferential box girder welded to and around the outer periphery of the I-beams and also mechanically interlocked therewith. These I-beams and the box girder form a welded and mechanically interlocked unitary structure such that the welded joints interconnecting the various components are in states of compression and such that the structure will retain sufficient structural integrity to support its core assembly in the desired manner even if all of these welded joints should fail. The entire unitary structure is welded to and supported on the top edge of a circumferential support skirt, again in a state of compression, such that the circumferential skirt will nevertheless maintain the structural unit in a supported position should the welded joint between the two also fail.

Having discussed the present invention generally, attention is now directed to a detailed description of the latter in conjunction with the drawings wherein:

FIG. 1 is an elevational view, partially in section, of a nuclear reactor including a reactor vessel, an overall core assembly contained within the vessel and a structural arrangement which is also located within the vessel for supporting the core assembly therein and which is designed in accordance with the present invention;

FIG. 2 is a partially broken away plan view of a section of the structural arrangement of FIG. 1;

FIG. 3 is a vertical sectional view of a reactor vessel and structural support arrangement illustrated in FIG. 2 and generally taken along line 3—3 in FIG. 2;

FIG. 4 is an exploded, perspective view illustrating the way in which two transverse I-beam sections are interconnected together in forming part of the overall structural support arrangement illustrated in FIGS. 1, 2 and 3;

FIG. 5 is a vertical sectional view illustrating a detailed aspect of the structural support arrangement illustrated in FIG. 2 and taken generally along line 5—5 in FIG. 2; and FIG. 6 is a sectional view illustrating another detailed aspect of the structural support arrangement taken generally along line 6—6 in FIG. 5.

Turning now to the drawings, wherein like components are designated by like reference numerals throughout the various figures, a nuclear reactor generally indicated by the reference numeral 10 is illustrated in FIG. 1. In a preferred embodiment, this reactor is a pool type liquid metal fast breeder reactor but may be of any other type compatible with the present invention to be described hereinafter. As seen in FIG. 1, reactor 10 includes a main vessel structure 12 which extends below a reactor cover assembly 14 and which contains a number of reactor components within a pool of hot sodium generally indicated at 16 and a pool of cold sodium generally indicated at 18. The reactor components within the vessel structure include an overall core assembly 20 comprised of a central core 22 containing both fuel and blanket assemblies (not shown) and a coolant plena 24 supported in a fixed position within vessel structure 12 on and by an overall structural arrangement 26 which is constructed in accordance with the present invention and which will be discussed in detail hereinafter.

Other reactor components include one or more primary circulation pump assemblies 28 and associated discharge piping interconnecting the pump between the cold pool 18 and plena 24 for passing coolant from the cold pool to and through the core assembly for cooling the fuel and blanket assemblies and thereafter to hot pool 16. At least one intermediate heat exchanger 38, is provided to receive coolant from the hot pool for passage back to the cold pool after heat from the coolant has been transferred to an independent medium. An instrument tree 40 is mounted over the core. With the exception of structural support arrangement 26, all of these reactor components including ones which may or may not have been illustrated but which are not pertinent to the present invention are known and may be readily provided by those with ordinary skill in the art. Therefore, these latter components will not be discussed herein except where necessary for a better understanding of the present invention. In this latter regard, it should be noted that vessel structure 12 includes reactor vessel 42 having a bottommost, closed section 44 as illustrated best in FIG. 3.

Referring specifically to FIGS. 2 to 6, attention is now directed to a detailed description of structural arrangement 26 which, as stated previously, is constructed in accordance with the present invention. As will be seen hereinafter, this arrangement includes a grillage of I-beams generally indicated at 46 in FIG. 2, a circumferential box girder 48, best illustrated in FIG. 3, and a circumferential support skirt 50, also best shown in FIG. 3, all of which are interconnected together in the manner to be described for achieving the objectives discussed previously.

As best seen in FIG. 2, the grillage 46 of I-beams includes a first group of horizontally extending, spaced apart and substantially parallel I-beams 52 and a second group of horizontally, spaced apart and substantially parallel I-beams 54 extending transverse (preferably normal) to and across each of the I-beams 52 at specific crossing points or junctures 56. Each of the I-beams 52 includes a longitudinally extending intermediate section comprised of a vertically extending center web 58, an integrally formed, continuous lower horizontal flange 60 at the bottom of the web and integrally formed, upper horizontal flange sections 62 at the top of the web. The flange sections 62 define spaces 64 between one another and include upwardly chamfered welding surfaces 66 on opposite sides of each space. Finally, a fabrication access hole 68 is provided through web 58 a predetermined distance between each space 64 along with a vertical slot 70 extending upward from each access hole to the top edge of the web so as to open into the space. Each of the I-beams 54 is similar to I-beams 52 to the extent that it includes an intermediate section comprised of a center web 72 and longitudinally spaced fabrication access holes 74. However, the intermediate section of each I-beam 54 includes an integrally formed continuous flange 76 at the top edge of its web (rather than at its bottom) and discontinuous flange sections 78 at the bottom of its web (rather than at its top). Sections 78 define spaces 80 therebetween and include downwardly directed chamfered surfaces 82 in vertical alignment with associated access holes 74. Finally, each access hole and space 80 include a vertically extending slot 84 therebetween.

Only the intermediate sections of the I-beams 52 and 54 have thus far been described. For reasons to be discussed hereinafter, each of these I-beams also includes opposite end sections 86 (in the case of I-beams 52) and 88 (in the case of I-beams 54) which are best shown in FIG. 2. As seen there and in FIG. 6, each of these end sections is flangeless, that is, it includes only web 58 or 72 without an associate flange and flange sections and, while it may include an access hole as shown in FIG. 3, it does not necessarily include an associated slot.

As stated previously, the I-beams 52 and 54 cross one another at crossing points or junctures 56. Each I-beam 54 is welded to and mechanically interlocked with each I-beam 52 at each crossing point or juncture 56 in a particular way which is best illustrated in FIG. 4. One of the crossing points is shown therein in an exploded view such that a given access hole 74, its associated space 80 and slot 84 of I-beam 54 are vertically aligned above a given access hole 68, its associated spaces 64, and slot 70 of I-beam 52. The two I-beams illustrated in FIG. 4 are interconnected by lowering the top I-beam 54 into and past the slot 70 and access hole 68 of lower I-beam 52 such that this latter hole and the hole 74 are perpendicular to but otherwise aligned with one another with slot 70 above these holes and slot 84 below them. The space 64 between flange sections 62 is just wide enough to receive an aligned transverse section of flange 76 such that welding surfaces 66 engage the underside of this transverse flange section. In a similar manner, the space 80 is just wide enough to receive an aligned transverse section of flange 60 so that welding surfaces 82 engage the top side of this latter transverse flange section. Each welding surface is welded to its engaging flange surface to provide a welded joint which is maintained in a state of compression. At the same time, the I-beams are mechanically interlocked such that the lower I-beam 52 supports the upper I-beam 54 even if the welded joint should fail.

The foregoing has been a description of the way in which a given pair of I-beams 52 and 54 are interconnected at a particular crossing point or juncture 56. It is to be understood that the I-beams are interconnected in this way at each and every crossing point in a preferred embodiment.

Referring specifically to FIGS. 2 and 3 in conjunction with FIGS. 5 and 6, attention is now directed to circumferential box girder 48. While not shown, this girder extends entirely around the outer periphery of I-beam grillage 46 in a circular fashion. As seen best in FIG. 3, the box girder includes an inner circumferential, vertical support plate 88 and an outer circumferential support plate 90 which also extend vertically except for a circumferentially extending, outward and downwardly facing step or shoulder 92. The two support plates are interconnected to one another to form a boxed cross section by top and bottom interconnecting plates 94 and 96, respectively (illustrated only in FIG. 2). All of these plates are interconnected together in a suitable manner, preferably by welded joints, to provide the cross-sectional configuration illustrated in FIG. 3. Reinforcement webs 98 may be suitably connected within and made part of the overall box girder at spaced-apart radial positions within the box girder, as seen in FIG. 2. In addition, for reasons to be discussed below, the inner circumferential support plate 88 includes a plurality of circumferentially spaced apart, vertical through slots 100, one of which is best seen in FIG. 6.

There is one through slot 100 for each I-beam end section 86 and 88 and each slot is positioned to receive therethrough an associated I-beam end section as illustrated in FIG. 6. As shown there, an end section 86 extends through the slot 100 and engages the inner surface of outer circumferential plate 90. In this regard, in a preferred embodiment, the end of each I-beam end section is preferably stepped in a way which conforms with the stepped configuration of the outer circumferential support plate so as to engage the inner surface of the latter along its entire vertical extent. As seen in FIG. 6, end section 86 is not only mechanically interlocked with the box girder as a result of passing through slot 100 and sitting on step 92, but it is also welded to both plates as indicated by the various weld joints 102 in FIGS. 5 and 6.

From the foregoing, it should be apparent that the grillage 46 of I-beams 52 and 54 and the circumferential box girder 48 are welded and mechanically interlocked to form an integral unit. This overall unit is supported in a horizontally extending position on top of the top circumferential edge of previously mentioned support skirt 50. As best seen in FIG. 3, the bottommost circumferential edge of the support skirt rests against and is connected to the inner surface of vessel 42 across the bottom section 44 thereof, preferably by means of a welded joint. The top circumferential edge of the skirt engages circumferential shoulder 92 and is welded thereat by a weld joint maintained in a state of compression. However, it should be apparent that even if the welded joint should fail, the mechanical interlocking configuration between the stepped support plate 90 and the circumferential skirt is such that the latter will continue to support the entire box girder and its associated grillage of I-beams.

With structural support arrangement 96 constructed in the foregoing manner, should all the weld joints fail, the various components making up the arrangement are nevertheless mechanically interlocked to provide sufficient structural integrity to support core assembly 20 in a limited downwardly deflected position. The amount of deflection which actually results from a total failure is detectable so that appropriate action may be immediately taken. In an actual working embodiment where the overall structural arrangement includes the dimensions illustrated in the drawing and where the weight being supported is about 2000 tons, the amount of deflection or sag in the structure resulting from a total failure in its welded joints is approximately 2 inches while the deflection in individual joints due to individual failures there have been found to be much less than 0.25 inches (a limit set by the reactivity insertion due to the relative control rod withdrawl of that amount).

The advantage of a relatively large total deflection, for example, one as large as 2 inches, before the entire core assembly collapes is that such a deflection is detectable under normal operation of the reactor, specifically by means of the control rod position indicators which would show an increased insertion from the same radioactivity/power level. This means that additional deflection monitors are not necessary. Another advantage of the present arrangement resides in the ability of the grillage of I-beams to be readily assembled in the field. The mechanical interlocks not only serve as a mechanical backup to the welded joints should the latter fail as discussed previously, but also simplifies and improves field fabrication by simplifying alignment of the I-beams and minimizing distortion during welding. The box girder stiffens the overall structure against deflections during seismic events and reduces stresses in the support skirt. The latter is also sufficiently flexible to absorb differential expansion and rotation of the box girder. In a preferred embodiment, the I-beams are constructed of type 304 stainless steel, the plates making up the box girder are constructed of type 304 stainless steel as is the support skirt. However, it is to be understood that the type of material selected as well as the size, shape and strength requirements generally of the individual components making up arrangement 26 will be dictated and readily provided by the overall reactor design.

What is claimed is:

1. In a nuclear reactor of the type including a reactor vessel and a core assembly to be maintained in a fixed position within said vessel, a structural arrangement also located in said vessel for supporting said assembly in said fixed position, said arrangement comprising a plurality of components interconnected with one another by both welded joints and mechanical interlocks so as to define a unitary structure which supports said core assembly in said fixed position and which has sufficient structural integrity to support said assembly in a limited downwardly deflected position if all of said welded joints should fail, said plurality of components including a first group of horizontally extending, spaced apart and substantially parallel lower I-beams and a second group of horizontally extending, spaced apart and substantially parallel upper I-beams extending transverse to and across each of the lower I-beams in said first group of specific crossing point whereby to form an overall grillage of I-beams, each of said upper I-beams being interconnected to all of said lower I-beams at their crossing points by welded joints and also by mechanical interlocks such that said lower I-beams will support said upper I-beams in said limited downwardly deflected position in the event of total failure of the welded joints interconnecting said I-beams said components also including a box girder extending circumferentially around said grillage of I-beams, each of said upper and lower I-beams having opposite end sections, each of which is welded to and mechanically interlocked with said box girder at a predetermined point along its circumference.

2. A structural arrangement according to claim 1 wherein said upper I-beams are positioned against said lower I-beams such that the welded joints connecting the lower I-beams are maintained in a state of compression.

3. A structural arrangement according to claim 2 wherein each of said lower I-beams includes a vertically extending, upwardly opening slot at each of its crossing points for receiving and interlocking with an adjacent section of an upper I-beam and wherein each of said upper I-beams includes a vertically extending, downwardly extending slot at each of its crossing points for receiving and interlocking with an adjacent section of a lower I-beam, the slots at each crossing point cooperating with each other such that the top and bottom sides of said I-beams are co-planar.

4. A structural arrangement according to claim 1 wherein said box girder includes an inner circumferentially extending plate including spaced vertical through slots and an outer circumferentially extending plate spaced outwardly from and connected with said inner plate and wherein the end sections of said I-beams extend into said girder through a corresponding one of said vertical slots so as to mechanically interlock with said girder.

5. A structural arrangement according to claim 1 wherein said box girder includes a downwardly facing, horizontally extending circumferential shoulder having an outermost peripheral edge and wherein said components include a circumferential skirt supported by and within said reactor vessel, said skirt having a vertically upwardly facing top end welded to said circumferential shoulder for supporting said girder and grillage of I-beams even if the welded connection between the girder and skirt should fail.

6. In a nuclear reactor of the type including a reactor vessel and a core assembly to be maintained in a fixed position within said vessel as well as control rod position indicators associated with said core assembly, a structural arrangement also located in said vessel for supporting said assembly in said fixed position, said structural arrangement comprising a plurality of components interconnected to one another by welded joints so as to define a unitary structure capable of supporting said core assembly within said vessel, said components also being mechanically interlocked such that a total failure of said welded joints will result in limited downward deflection of said unitary structure when supporting said core assembly while, at the same time, retaining sufficient structural integrity to maintain said assembly in a downwardly deflected but supported position, said downward deflection being sufficiently large to be detected by said control rod position indicators.

7. A structural arrangement according to claim 4 wherein said outer plate includes inwardly extending and upwardly facing shoulder means in confronting relationship with each of said slots and wherein the end sections of said I-beams extending through associated ones of said slots are configured to engage and rest on confronting ones of said shoulders so as to further mechanically interlock with said box girder.

8. A structural arrangement according to claim 7 wherein said outer plate displays a stepped cross-sectional configuration along its entire circumference so as to define said inwardly and upwardly facing shoulder means.

9. In a nuclear reactor of the type including a reactor vessel and a core assembly to be maintained in a fixed position within said vessel, a structural arrangement also located in said vessel for supporting said assembly in said fixed position, said arrangement comprising a plurality of components interconnected with one another by both welded joints and mechanical interlocks so as to define a unitary structure which supports said core assembly in said fixed position and which has sufficient structural integrity to support said assembly in a limited downwardly deflected position if all of said welded joints should fail, said plurality of components including a first group of horizontally extending, spaced apart and substantially parallel lower I-beams and a second group of horizontally extending, spaced apart and substantially parallel upper I-beams extending transverse to and across each of the lower I-beams in said first group at specific crossing point whereby to form an overall grillage of I-beams, each of said upper I-beams being interconnected to all of said lower I-beams at their crossing points by welded joints and also by mechanical interlocks such that said lower I-beams will support said upper I-beams in said limited downwardly deflected position in the event of total failure of the welded joints interconnecting said I-beams, said components also including a box girder extending circumferentially around said grillage of I-beams, each of said upper and lower I-beams having opposite end sections, each of which is welded to and mechanically interlocked with said box girder at a predetermined point along its circumference, said box girder including an inner circumferentially extending plate including spaced vertical through slots and an outer circumferentially extending plate spaced outwardly from and connected with said inner plate, in the end sections of said I-beams extending into said girder through a corresponding one of said vertical slots so as to mechanically interlock with said girder, said outer plate including an inwardly extending and upwardly facing shoulder means in confronting relationship with each of said slots, the end sections of said I-beams extending through an associated one of said slots being configured to engage and rest on confronting ones of said shoulders so as to further mechanically interlock with said box girder; and said outer plate also including downwardly facing outwardly extending circumferential shoulder means, said components including a circumferential skirt supported by and within said reactor vessel, said skirt having a vertically upwardly facing top end welded to said outwardly extending shoulder means for supporting said girder and grillage of I-beams even if the welded connection between said skirt should fail.

10. A structural arrangement according to claim 9 wherein said reactor includes control rod indicators associated with said core assembly and wherein said downwardly deflected position is sufficiently large to be detected by said control rod indicators.

* * * * *